United States Patent [19]
Sons

[11] 3,919,600
[45] Nov. 11, 1975

[54] OVERLOAD CURRENT PROTECTOR FOR A. C. MOTORS

[75] Inventor: James E. Sons, Sanger, Tex.

[73] Assignee: Detprotector, Inc., Dallas, Tex.

[22] Filed: Apr. 25, 1974

[21] Appl. No.: 463,976

Related U.S. Application Data

[63] Continuation-in-part of Ser. No. 342,398, March 19, 1973, Pat. No. 3,840,780, which is a continuation of Ser. No. 150,541, June 7, 1971, abandoned.

[52] U.S. Cl. ......... 317/13 R; 317/27 R; 317/33 SC; 317/36 TD; 317/46
[51] Int. Cl.² .................................. H02H 7/085
[58] Field of Search .... 317/13 R, 13 A, 13 B, 13 C, 317/27 R, 19, 33 SC, 46, 36 TD

[56] References Cited
UNITED STATES PATENTS

| | | | |
|---|---|---|---|
| 3,368,129 | 2/1968 | Chausse et al. | 317/13 R |
| 3,696,288 | 10/1972 | Carman | 317/13 R |
| 3,742,302 | 6/1973 | Neill | 317/13 R |
| 3,742,303 | 6/1973 | Dageford | 317/13 A |

Primary Examiner—James D. Trammell
Attorney, Agent, or Firm—Richards, Harris & Medlock

[57] ABSTRACT

The specification discloses a system for preventing current overload in a multi-phase alternating current motor. Current transformers are coupled to each of the phases of the motor and voltage outputs of each of the transformers and are connected to a summing point. A differential amplifier is connected to the summing point for detecting the occurrence of a current overload on any of the phases. A digital circuit is connected to the differential amplifier for generating a logic level in dependence upon the output of the amplifier. A timing circuit including a normally conductive field effect transistor is coupled to the digital circuit. Upon the occurrence of an overload signal, the timing circuit initiates a timing cycle during which current may not be reapplied to the motor. A transistor switch normally maintains a triac in conduction and the triac operates the contactor relay to normally supply current to the motor phases. Upon the occurrence of an overload current, the transistor switch turns the triac off and terminates current flow to the phases of the motor. Light emitting diodes are provided to indicate when the timing cycle is in effect and when a current overload condition exists.

5 Claims, 1 Drawing Figure

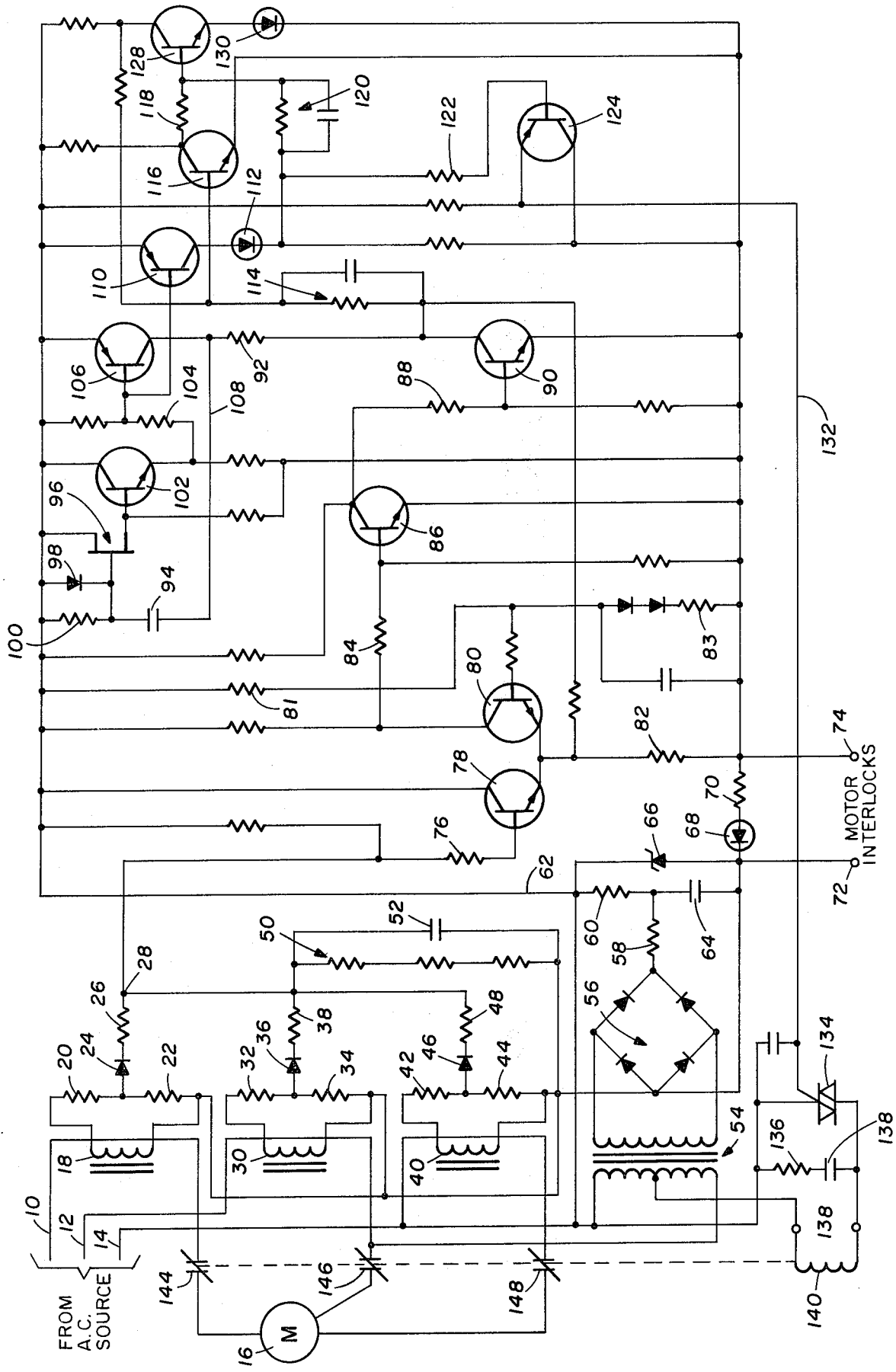

OVERLOAD CURRENT PROTECTOR FOR A. C. MOTORS

CROSS REFERENCE TO RELATED APPLICATION

The present application is a continuation in part of application Ser. No. 342,398, filed March 19, 1973, now U.S. Pat. No. 3,840,780, granted Oct. 8, 1974, said application Ser. No. 342,398 in turn being a continuation of application Ser. No. 150,541, filed June 7, 1971, now abandoned.

FIELD OF THE INVENTION

This invention relates to motor protection systems and more particularly relates to a system for providing current overload protection to a multi-phase A. C. motor and for preventing operation of the motor for a predetermined time interval after the occurrence of a current overload.

THE PRIOR ART

A number of protection systems have been heretofore developed in order to prevent damage to electrical motors due to excessive current. Such prior systems have included circuitry for sensing the current level applied to a three-phase electrical motor and for terminating the supply of current to the motor when the sensed current rises above a predetermined level. However, such previously developed circuits have not been completely satisfactory with respect to reliability and accuracy of operation. Moreover, it is desirable to provide timing circuitry in such protection motors which provides an accurate timing interval during which the motor may not be re-energized after the occurrence of an overload.

SUMMARY OF THE INVENTION

The present invention eliminates or reduces the problems heretofore associated with prior motor protection systems. In accordance with the present invention, a system is provided for protecting an alternating current phase from a current overload which includes circuitry for sensing the current level on the phase. Circuitry is responsive to the sensing circuitry for detecting the occurrence of an overload current level. A first transistor is responsive to the detecting circuitry for becoming conductive to initiate operation of a timing circuit. A second normally conductive transistor is responsive to the detecting circuitry for becoming nonconductive. A third normally conductive transistor is coupled to the second transistor for becoming nonconductive in response to a current overload. A triac is operable in response to the third transistor for terminating current flow through the phase. The timing circuit is operable for a predetermined time after the current overload to prevent re-establishment of current flow through the phase.

In accordance with another aspect of the invention, a system for protecting a multi-phase alternating current motor from current overload includes a current transformer coupled to each of the phases of the motor. Circuitry connects the output of each of the transformers to a summing point. A differential amplifier is connected to the summing point for detecting the occurrence of a current overload on any of the phases. A digital circuit is connected to the amplifier for generating a logic level in dependence upon the output of the amplifier. A normally conductive field effect transistor is coupled to the digital circuit for becoming nonconductive upon the occurrence of a current overload. A charging capacitor is connected to a field effect transistor. A pair of normally nonconductive transistors are coupled to the field effect transistor, one of the pair of transistors being coupled to the capacitor in order to initiate a timing cycle before the field effect transistor may be again rendered conductive after the occurrence of a current overload. The other of the pair of transistors is operable to energize a first light emitting diode to indicate the occurrence of a timing cycle. A transistor switch normally maintains a triac in conduction and is operable in response to the occurrence of a current overload to render the triac conductive. A contactor relay is operable in response to the state of conduction of the triac to terminate the current flow through the phases when the triac is nonconductive.

DESCRIPTION OF THE DRAWING

For a more complete understanding of the present invention and for further objects and advantages thereof, reference is now made to the following description taken in conjunction with the accompanying drawing, in which the FIGURE illustrates a schematic diagram of the preferred embodiment of the invention.

DESCRIPTION OF THE PREFERRED EMBODIMENT

Referring to the FIGURE, a three-phase A. C. line includes phase lines 10, 12 and 14 which are connected to supply alternating current three-phase voltage to an A. C. motor 16. A current transformer 18 is disposed adjacent phase line 10 and is connected to a voltage divider network including resistors 20 and 22. The anode of a diode 24 is connected to the juncture of resistor 20 and 22 and is connected through a resistor 26 to a summing point 28. A second current transformer 30 is disposed adjacent phase line 12 and is connected to a resistor network including resistors 32 and 34. A diode 36 is connected to the juncture of resistors 32 and 34 and is connected through resistor 38 to the summing point 28. A third current transformer 40 is disposed adjacent phase line 14 and is connected to a resistor network including resistors 42 and 44. A diode 46 is connected between the resistors 42 and 44 and is connected through a resistor 48 to the summing point 28. Three series resistances 50 are connected across summing point 28 and terminals of the current transformers 18, 30 and 40. A capacitor 52 is connected across the resistances 50.

A transformer 54 is connected at one terminal to phase line 14. The output of the transformer is connected through a diode rectifier bridge 56 and is applied through resistors 58 and 60 to supply D. C. power via lead 62 to the remainder of the circuit. A capacitor 64 is connected between the juncture of resistors 58 and 60 and circuit ground. A zener diode 66 is connected across resistor 60 and capacitor 64.

A light emitting diode (LED) 68 is connected in series with a resistor 70 across terminals 72 and 74. Terminals 72 and 74 are connected to the motor interlocks of motor 16 which comprise normally closed contacts, not shown, which are operable in response to motor pressure, temperature and the like. Normally the interlock switches are closed and the LED 68 is shorted and therefore is not illuminated. However, when any of the motor interlocks become opened because of a malfunction, the LED 68 becomes energized and becomes illuminated to indicate an open interlock.

The summing point 28 is applied through a resistor 76 to the base of a transistor 78. The emitter of transistor 78 is tied to the emitter of transistor 80 to form a differential amplifier. The emitters of transistors 78 and 80 are tied to circuit ground via a resistance 82. Resistor 81 is connected between the source of bias potential and the gate of transistor 80. A resistor 83 is connected between the gate of transistor 80 and circuit ground. The output of the differential amplifier is applied from the collector of transistor 80 through a resistor 84 to the base of a transistor 86. The collector of transistor 86 is tied through a resistance 88 to the base of a transistor 90. Transistors 86 and 90 thus form a digital logic circuit which operates to supply a suitable digital output for operation of the switch and timing circuitry of the invention. The collector of transistor 90 is applied through a resistor 92 and a capacitor 94 to the gate of a field effect transistor (FET) 96. A diode 98 is connected between the gate of FET 96 and a source of bias potential. A resistor 100 is connected across the diode 98. The drain of FET 96 is connected to the source of bias potential, while the source of the FET 96 is connected to the base of a transistor 102. The emitter of resistor 102 is applied through a resistance 104 to the base of a transistor 106. The collector of transistor 106 is applied via lead 108 to a terminal of capacitor 94. The base of transistor 106 is tied to the base of a transistor 110, the collector of which is connected to a light emitting diode (LED) 112.

The collector of transistor 90 is applied through an R-C network 114 to the base of a transistor 116. The collector of transistor 115 is applied through a resistance 118 and through an R-C circuit 120 to a terminal of the LED 112. The R-C network 120 is also connected through a resistance 122 to the base of a transistor 124. The emitter of transistor 124 is connected to the source of bias potential, while the collector of transistor 124 is connected to circuit ground.

The collector of transistor 116 is also connected to resistor 118 to the base of a transistor 128. The emitter of transistor 128 is connected through a light emitting diode (LED) 130 which is operable to indicate an overcurrent. The emitter of transistor 124 is connected via lead 132 to the gate of a triac semiconductor device 134. A resistor 136 and capacitor 138 are connected in series across the triac 134. A terminal of the contactor relay 140 for the motor 16 is connected to the triac 134, while the other terminal of the relay coil 140 is connected to a center tap connection of the transformer 54. The contactor relay 140 controls the operation of three sets of relay contacts 144, 146 and 148, each of which is connected in one of the phase lines 10, 12 or 14, respectively. Relay contacts 144, 146 and 148 are normally closed in order to provide current flow to the motor 16.

In operation of the circuit shown in the FIGURE, alternating current three-phase voltage is applied via the phase lines 10, 12 and 14 and through the closed relay contacts 144, 146 and 148 in order to operate the motor 16. The current transformers 18, 30 and 40 sense the current flowing through the phase lines 10, 12 and 14. The resistive networks connected across the current transformers apply voltages proportional to the sensed current to the summing point 28. Under normal operating conditions, the voltage at the summing point 28 is below a reference voltage established by resistors 81 and 83, and thus transistor 78 is normally nonconductive and transistor 80 is conductive. Transistor 86 is normally nonconductive and transistor 90 is normally conductive.

Under normal operating conditions, the FET 96 and transistor 102 are conductive, while transistors 106 and 110 are normally off. Transistor 116 is normally on and transistor 128 is normally nonconductive. Transistor 124 is normally conductive and therefore provides voltage to the gate of the triac 134 in order to maintain the triac 134 on. Conduction of the triac 134 causes energization of the contactor relay coil 140, thereby maintaining the relay contacts 144, 146 and 148 in their normally closed positions.

However, upon the occurrence of an overload condition on any one of the phase lines 10, 12 or 14, the summed voltage at the summing point 28 will increase. This increase in voltage is applied to the differential amplifier comprising transistors 78 and 80. When the increase in voltage becomes greater than the reference voltage determined by resistors 81 and 83, the differential amplifier flips and transistor 78 is turned on and transistor 80 is turned off. The collector of transistor 80 becomes positive and the positive voltage is coupled to turn the transistor 86 on. The collector of transistor 86 goes essentially to zero voltage and thus transistor 90 is turned off. The collector of transistor 90 then goes high. Transistors 86 and 90 act as a digital logic circuit to provide fast switching and to provide the correct logic to drive the timing circuitry of the invention.

The high voltage at the collector of transistor 90 is applied to back bias the drain of the FET 96 and the base of the transistor 102, thereby turning both the FET 96 and the transistor 102 off. In normal operation, the capacitor 94 is charged through the diode 98 such that approximately 10 volts is maintained across the capacitor 94. The resistance 100 has a high value and thus the capacitor 94 is not able to quickly discharge in the reverse direction. Thus, when the collector of transistor 90 goes high, the voltage across the capacitor 94 is essentially doubled, thereby back biasing the FET 96 and the transistor 102. When transistor 102 becomes nonconductive, voltage is applied to the bases of transistors 106 and 110, thereby turning transistors 106 and 110 on. The conduction of transistor 110 causes the LED 112 to become illuminated, thereby indicating that the timer is on.

The conduction of transistor 90 causes the transistor 116 to be turned off, thereby causing transistor 128 to be turned on. This causes the LED 130 to be illuminated to indicate the occurrence of an overcurrent condition. Transistor 124 thus becomes nonconductive and causes triac 134 to be turned off. This terminates the current flow through the contactor relay 140 and causes the relay contacts 144, 146 and 148 to become opened, thereby stopping operation of the motor 16 to prevent damage to the motor 16.

When transistor 106 becomes conductive, essentially a short is applied to a terminal of the capacitor 94. The capacitor 94 then discharges until the FET 96 and transistor 102 are no longer back biased and again become conductive. At this point, the transistors 106 and 110 are again turned off, transistors 116 and 124 are turned on and transistor 128 turned off. Triac 134 is then again energized and the contactor relay is energized to again supply current to the motor 16. The time for the capacitor 94 to discharge determines the timing cycle of the system. In one embodiment, a timing period of approximately 5½ minutes was provided. During this timing interval, the motor 16 cannot again be energized.

The present system thus provides an efficient and accurate system for continuously detecting overload conditions and line interruptions in A. C. motors. The present system requires sensing only in the primary three-phase lines supplied to the motor and does not require any sensing of the secondary lead to the motor. While the present system works well in preventing overload on A. C. motors driving air conditioning systems or the like, it will be apparent that the present system is also applicable for use with any A. C. motor.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A system for protecting a multi-phase alternating current motor from current overload comprising:

a current transformer coupled to each of said phases of said motor, means for connecting the output of each of said transformers to a summing point, a differential amplifier connected to said summing point for detecting the occurrence of a current overload on any of said phases, a digital circuit connected to said amplifier for generating a logic level in dependence upon the output of said amplifier, a normally conductive field effect transistor coupled to said digital circuit for becoming nonconductive upon the occurrence of a current overload, a capacitor connected to said field effect transistor, a pair of normally nonconductive transistors coupled to said field effect transistor, one of said pair of transistors coupled to said capacitor in order to initiate a timing cycle before said field effect transistor may be again rendered conductive after the occurrence of a current overload, a first light emitting device, the other of said pair of transistors operable to energize said first light emitting device to indicate the occurrence of said timing cycle, a triac, switch means for normally maintaining said triac in conduction and operable in response to the occurrence of a current overload to render said traic nonconductive, and relay means operable by said triac to terminate current flow through said phases when said triac is nonconductive.

2. The system of claim 1 wherein said switch means comprises:

a pair of intercoupled normally conductve transistors responsive to the occurrence of a current overload to be rendered nonconductive.

3. The system of claim 2 and further comprising:

a second light emitting device, and a normally nonconductive transistor responsive to one of said pair of normally conductive transistors in order to energize said second light emitting device to indicate the occurrence of a current overload.

4. The system of claim 1 and further comprising:

means responsive to the operation of an interlock circuit on said motor to visually indicate an interlock malfunction.

5. The system of claim 1 wherein said triac is powered from one of said alternating current phases.

* * * * *